US006273986B1

(12) United States Patent
Egan

(10) Patent No.: US 6,273,986 B1
(45) **Date of Patent: *Aug. 14, 2001**

(54) COMPOSITE LABELS, PACKAGE LABELING SYSTEMS AND LABELING METHODS

(76) Inventor: Kevin J. Egan, 6612 Branch Hill Guinea, Loveland, OH (US) 45140

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,232

(22) Filed: Mar. 5, 1998

Related U.S. Application Data

(60) Provisional application No. 60/043,268, filed on Apr. 18, 1997.

(51) Int. Cl.[7] .............................. B32B 31/00; B32B 9/00

(52) U.S. Cl. .......................... 156/277; 156/247; 156/289; 428/40.1; 229/74

(58) Field of Search .................................... 156/277, 247, 156/289, 270, 344, 584; 428/40, 43; 462/901; 229/74

(56) References Cited

U.S. PATENT DOCUMENTS

| | | | | |
|---|---|---|---|---|
| 2,363,472 | * | 11/1944 | Ritter | 428/43 |
| 3,159,930 | * | 12/1964 | Allen et al. | 229/74 |
| 3,199,769 | * | 8/1965 | Hillman, II et al. | 229/74 |
| 3,524,271 | * | 8/1970 | Buske | 40/638 |
| 3,580,489 | * | 5/1971 | Oettinger | 229/74 |
| 4,343,492 | * | 8/1982 | Fitxgibbons | 462/901 |
| 4,398,985 | * | 8/1983 | Eagon | 156/277 X |
| 4,526,405 | * | 7/1985 | Hattemer | 428/40 X |
| 4,544,590 | | 10/1985 | Egan . | |
| 4,568,403 | | 2/1986 | Egan . | |
| 4,612,076 | * | 9/1986 | Moss | 156/277 X |
| 4,747,619 | * | 5/1988 | Sager | 428/40 X |
| 4,857,121 | * | 8/1989 | Markley et al. | 156/277 X |
| 4,928,874 | * | 5/1990 | Henry et al. | 462/901 |
| 4,932,684 | * | 6/1990 | Vermeulen | 156/247 X |
| 4,938,505 | * | 7/1990 | Gruttemeyer et al. | 462/901 |
| 5,297,993 | * | 3/1994 | Gullett et al. | 462/6 |
| 5,342,461 | * | 8/1994 | Murphy | 156/64 |
| 5,421,778 | * | 6/1995 | Kouramanis | 462/2 |
| 5,425,823 | * | 6/1995 | Woodside, III | 156/277 X |
| 5,439,721 | * | 8/1995 | Pedroli et al. | 428/40 |
| 5,639,125 | * | 6/1997 | Garrison | 283/81 |
| 5,653,473 | * | 8/1997 | Laszutko et al. | 283/81 |

* cited by examiner

*Primary Examiner*—Mark A. Osele
*Assistant Examiner*—Sue A. Purvis
(74) *Attorney, Agent, or Firm*—Wood, Herron & Evans, L.L.P.

(57) ABSTRACT

A labeling system which utilizes composite label construction and related labeling methods are described. The invention contemplates one or more coupon-type labels placed one over the other onto a package. In one context, the composite label of the invention serves as a combination shipping label and packing list label.

24 Claims, 2 Drawing Sheets

COMPOSITE LABELS, PACKAGE LABELING SYSTEMS AND LABELING METHODS

RELATED APPLICATION

Pursuant to 37 C.F.R. §1.78(a)(4), this application is a continuation of, claims the benefit of and priority to prior filed co-pending Provisional Application No. 60/043,268, filed Apr. 18, 1997, which is expressly incorporated herein by reference.

FIELD OF THE INVENTION

The invention relates to composite labels, package labeling systems and labeling methods, and more particularly to labeling systems which utilize a composite label construction and the related labeling methods.

BACKGROUND OF THE INVENTION

In the context of shipping packages containing goods, the typically utilized label construction consists of a face stock on which indicia may be printed, such as shipping information or other labeling information. The face stock has a primary adhesive (such as a pressure sensitive adhesive) on the back surface thereof and the face stock and adhesive are carried on a release or liner backing. In use, the label face sheet is removed from the liner and affixed to a package by means of the primary adhesive. The shipping label is thereby semi-permanently secured to the package. What is meant by "semi-permanently secured, " as compared with "releasably secured," is that the label is not intended to be readily removable from the package, and forcible removal of the label generally results in disruption of either the label, the package, or both. In automated labeling systems, the typical label construction described above is printed and applied to the package in a "print and apply" machine which prints the desired indicia on the label, removes the label from the liner and applies the label to the package.

Again in the context of shipping packages containing goods, a packing list typically is included with the package for the purpose of listing the contents thereof, and any other pertinent information. Presently, it is commonplace for packing lists to be computer generated in a multiple carbonless copy format, manually folded and inserted into a clear plastic envelope attached to the outside of the package being shipped. In this typical scenario, the package recipient removes the packing list from the plastic envelope, can utilize it to verify the package contents, and can retain a file copy for record keeping purposes, etc. Packing lists as described above add appreciable costs to the shipping process in terms of materials (copies and plastic envelopes) and labor (applying envelopes, folding and inserting the packing lists).

There have been attempts to streamline shipping label and packing list procedures and construction in the shipping industry. Companies such as Intermec and Standard Register have developed certain systems that provide a combination shipping label and packing list. These label systems, however, remain costly and somewhat cumbersome to use.

What is needed for the package shipping industry is a simplified, economical labeling system and method for providing shipping labels and packing lists in combination that may be particularly adaptable for "print and apply" users.

SUMMARY OF THE INVENTION

The present invention is directed to a composite label construction, labeling system and method which are simplified and economical relative to prior systems and methods. More particularly, in a preferred embodiment, the label construction and system of the present invention comprises the combination of two or more labels of the "coupon" type placed one over the other onto a package. The outer coupon-type label serves as the shipping label and the inner coupon-type label serves as the packing list. It should be appreciated, however, that the present invention is not to be construed as limited to shipping and packing list labels, but is applicable to all other types of labeling or identification of packages.

Coupon-type labels generally comprise a face stock with a fugitive adhesive on the back surface thereof to releasably attach the face stock to a middle ply, which may be clear film or opaque paper stock. The middle ply itself has an adhesive backing which is a primary adhesive (of the pressure sensitive type) and affixes the coupon-type label to a release liner. Upon peeling the entire label from the release liner, the primary adhesive is utilized to affix the label to the desired surface by pressure application. The term "coupon-type" label is used because in one common application of this label type the face stock can be peeled off of the middle ply and may have printing thereon so it can be used as a coupon. The use of a fugitive adhesive on the back of the face stock is advantageous because no appreciable adhesive residue is left on the middle ply, which remains affixed to the package surface by virtue of the primary adhesive. One producer of coupon-type labels is MPI Label Systems who sell such labels under the product name Prime Plus®. In the context of the present invention, the shipping label and packing list label are the removable "coupons" in the coupon-type labels utilized.

In the present invention, the two labels are applied in registration with one another so that the packing list information is concealed until such time as the recipient removes the shipping label to reveal the packing list beneath it. The aligned labels may also have bar code or other corresponding indicia on them so that the shipping label and packing label can be correlated and verified such as by utilizing an automatic scanner for verification. An additional advantage of the use of two or more coupon-type labels is that both can be applied using "print and apply" equipment, thereby simplifying and streamlining the labeling process. It will be appreciated, however, that the present invention is in no way intended to be limited to print and apply labeling processes. The composite labels of the invention could certainly be pre-printed or printed by the user and hand-applied.

In one preferred embodiment, the invention comprises a combination shipping label and packing list which can be applied to a package for shipment. The overall composite construction comprises the following layers in sequence from outer to inner:

- shipping label with shipping or address information printed thereon;
- fugitive adhesive;
- middle ply;
- primary adhesive;
- packing list;
- fugitive adhesive;
- base ply;
- primary adhesive; and
- package surface.

In this example, the middle ply is preferably a clear or substantially transparent film layer; although in certain applications that may not be necessary and an opaque layer would be suitable as the middle ply. It will also be appreciated by persons skilled in the art that techniques other than fugitive adhesives may be utilized in adhering the shipping label to the middle ply and the packing list to the base ply. One possible alternative is the use of a thermal bond or lamination to releasably adhere the shipping label and packing list to the middle ply and base ply, respectively. Thermal lamination or bonding is a technique known in the label art as described, for example, in U.S. Pat. Nos. 4,544,590 and 4,568,403.

In a preferred method of use, a package is conveyed along a conveyor to a first print and apply station for application of the packing list label, which is printed and applied utilizing techniques well known in the art for print and apply labeling. Thereafter the shipping label is applied on top of and in at least partial registration with the packing list label. Depending on the context, the shipping label may completely cover the packing list or it may only cover a portion thereof. In one embodiment, the shipping label and packing list label each have corresponding indicia, such as a bar code, for manual or automatic verification at a further downstream location in the conveyance of the package.

Upon receipt of a package utilizing the label system of the present invention, the recipient simply peels off the shipping label and discards it or retains it for record keeping, etc., if desired. The fugitive adhesive (or thermal lamination, if that technique is used) on the back of the shipping label is advantageous since it does not leave a residue and does not destroy or deleteriously affect the underlying label layers. The use of a clear film layer beneath the shipping label may be important when it is desired for the recipient to view through the clear film to the exposed packing list label surface for the packing list information. The clear film layer is preferably adhered to the packing list label by a primary adhesive and need not be removed. For recipients who require the packing list for their records, the top sheet of the packing list label is removable from the base ply by virtue of a fugitive adhesive (or thermal lamination) between the packing list top sheet and the base ply. The base ply is affixed to the package surface by a primary adhesive and is left in place thereon. The recipient can utilize the removed packing list for its internal accounting, record keeping or other purposes.

Because the packing list may contain sensitive information, it is important that there be a means for providing tamper evidencing. In the context of the present invention, the nature of the fugitive adhesive (or thermal lamination) is such that if the shipping label has been peeled away to reveal the packing list information, the recipient will be alerted because the shipping label cannot be replaced over the packing list in a manner that effectively conceals that the label has been previously removed.

The foregoing, as well as other objects, features and advantages of the present invention will become apparent to persons skilled in the art upon reading the following detailed description in conjunction with the drawings.

DETAILED DESCRIPTION OF THE INVENTION

Figure 1:
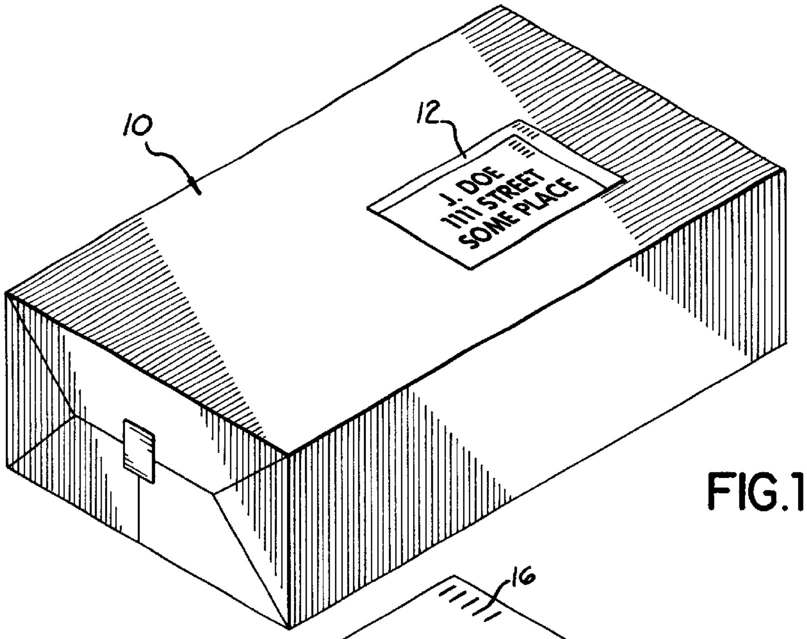
FIG. 1 is a perspective view of a package with a composite label of the present invention applied thereto.
Figure 2:
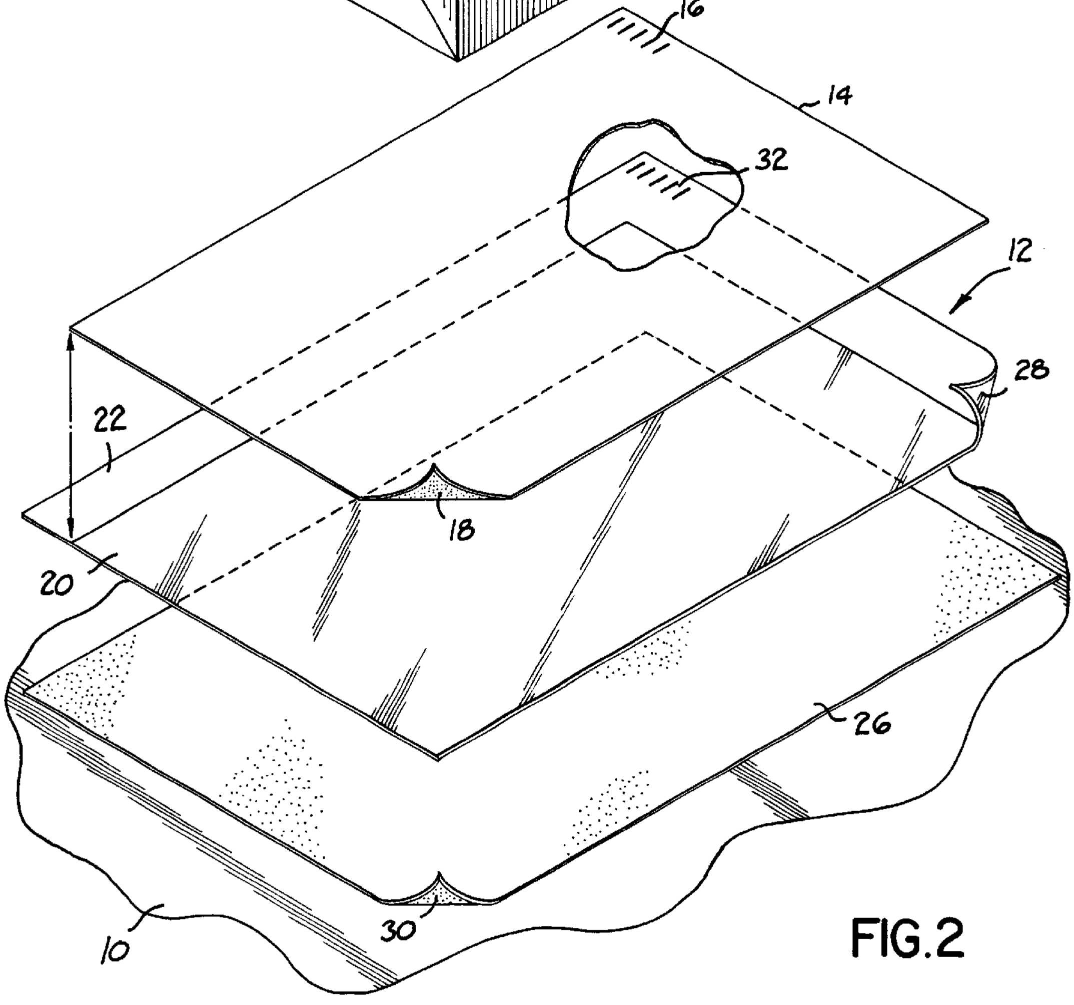
FIG. 2 is an exploded view, partially in phantom and partially broken away, of a composite label of the present invention.

FIG. 1 shows a package 10 having a composite label 12 of the present invention affixed thereto. It will be appreciated that the types and configurations of packages 10 with which the present invention can be used are virtually unlimited. In a preferred embodiment, the composite label 12 of the present invention conveys shipping information such as the address indicia shown on label 12 in FIG. 1, as well as packing list information for the contents of package 10. FIG. 2 shows an exploded representation of the element layers of the composite label 12 of the present invention and FIG. 3 shows a schematic cross-sectional representation of the composite label 12 of the present invention.

Figure 3:
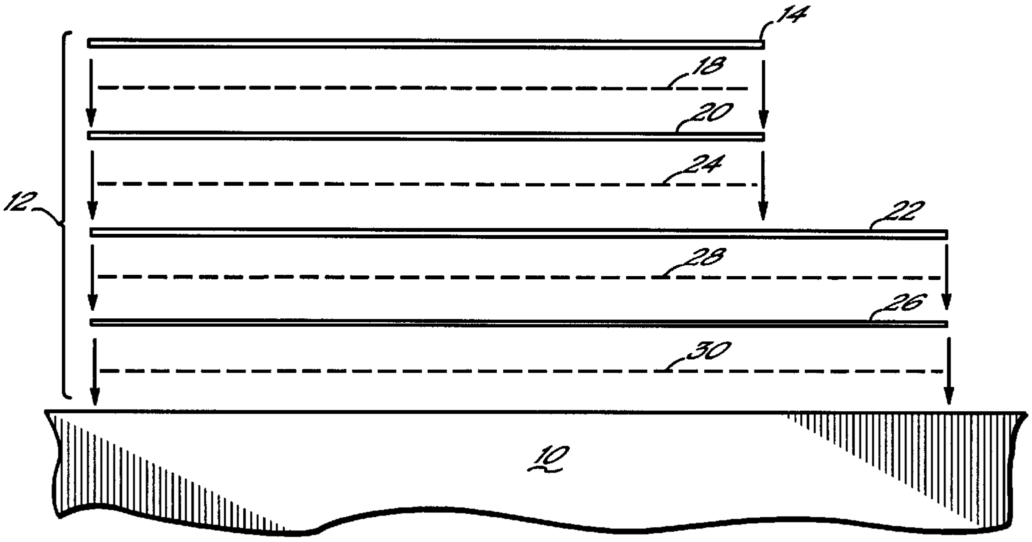
FIG. 3 is a schematic cross-sectional representation of a composite label of the present invention applied to a package.

In a preferred embodiment shown in FIGS. 2 and 3, the composite label 12 of the present invention comprises an address label or shipping label 14 as the upper or outermost label when the composite label 12 is attached to a package 10. The address label 14 carries the pertinent shipping information or other desired indicia thereon. Address label 14 may also optionally have indicia such as a bar code 16 or other suitable indicia thereon for identification/verification/correlation as will be described hereinbelow. Address label 14 of composite label 12 has a fugitive adhesive 18 on the undersurface thereof. Fugitive adhesives are well known in the art and permit easy separation of address label 14 from the underlying film or sheet 20. In the preferred embodiment shown, film 20 is a clear plastic material. In the context of this embodiment, it is important that film 20 be transparent so as to permit printed material on underlying packing list label 22 to be visible therethrough. Although it is also contemplated that film 20 may be an opaque layer. The clear film layer 20 is affixed to packing list label 22 by means of a primary adhesive 24 (FIG. 3). The packing list label 22 is itself adhered to a base ply 26 by means of a second fugitive adhesive layer 28. The base ply 26 may be a clear film such as clear film layer 20, or it may be a paper or paper-based ply. Base ply 26 is adhered to the surface of package 10 by a second primary adhesive 30. In a preferred embodiment, packing list label 22 has the packing list information for the package contents printed thereon in the region of the layer 22 that is covered by shipping label 14. Additionally, packing list label 22 includes indicia, such as a bar code 32 or other suitable indicia, for identification/verification/correlation as described in greater detail hereinbelow.

It will be appreciated by persons skilled in the label art, that the primary adhesives used in the context of the present invention are those types of adhesives commonly used in labels. Furthermore, the fugitive adhesives that are used can be any suitable fugitive adhesives known in the art that permit easy removal of the appropriate label layer. While a preferred embodiment is described as utilizing fugitive adhesive layers, it will be appreciated that other techniques in the label art could be utilized, such as thermal lamination or bonding.

It will also be appreciated that the middle ply (film 20) of composite label 12 and/or base ply 26 may have static copy preprinted thereon by the label manufacturer. The static copy may comprise all types of information, including re-order or return information, for example. The phrase “static copy” is intended to mean printing or other indicia that does not change from label to label within a particular group of labels. This is to be contrasted with the variable copy applied by the label user to the shipping label 14 and the packing list label 22, which indeed will vary from label to label.

Figure 4:
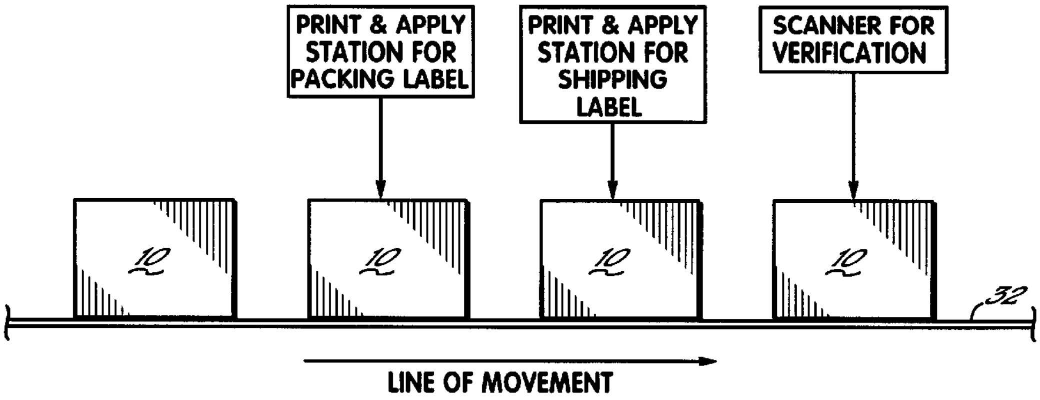
FIG. 4 is a schematic representation of a label application system and method of the present invention.

FIG. 4 is a schematic representation of one contemplated method of applying the composite label 12 of the present invention. As shown, package 10 is carried on a conveyor mechanism 32 in the direction of movement shown. At a first location downstream of the packing of package 10, the packing label, which comprises layers 22, 28, 26 and 30 (i.e., the packing list label 22, fugitive adhesive 28, base ply 26 and primary adhesive 30), is applied to package 10 in a print and apply station. Print and apply stations in the context of labeling systems are well known in the art and such systems are available from various sources such as Label Aire, Weber, Willett and Diagraph, among others.

In the typical print and apply labeling station, the information to be printed on the label is fed to the machine via a computer link which thereafter imprints the requisite information on the packing list label and applies it to the package 10 in a manner well known in the art. Subsequently, in a second print and apply station, the shipping label portion of the composite label 12 of the present invention is applied over the packing list label. The shipping label portion includes shipping label layer 14, fugitive adhesive 18, clear film layer 20 and primary adhesive 24. Similarly, and in accordance with well known principles, the shipping information is fed to the print and apply station, is imprinted on the shipping label 14, and thereafter that label is affixed to package 10 on top of the packing list label 22.

In a preferred embodiment, the labeled package 10 may pass through a scanner or other mechanism for verification purposes. To this end, shipping label 14 and packing list label 22 preferably have correlated bar code indicia thereon (16 and 32, respectively). A bar code scanner can be used to verify that the correct address label is matched and affixed to the corresponding packing list label 22 on package 10 so as to ensure that the proper contents are shipped to the correct address. In addition to bar codes on the labels for verification, visual verification and correlation could be made utilizing other suitable corresponding indicia.

Upon receipt of package 10, the recipient simply peels the address label 14 off of clear film 20. Fugitive adhesive 18 enables this and does not leave any appreciable adhesive residue, nor does it cause there to be a disruption of clear film 20. The address label 14 can then simply be discarded or retained for record keeping or other purposes. Upon removal of shipping label 14, the packing list information imprinted on packing list label 22 is visible through clear film 20. The recipient can then verify the presence of the listed contents in package 10. If need be for record keeping or other purposes, packing list label 22 is removable from base ply 26 by virtue of fugitive adhesive 28. The removed packing list label 22 can be filed or otherwise utilized by the recipient and the base ply 26 remains permanently affixed to the package 10 by virtue of primary adhesive 30. In the case of both the address label 14 and packing list label 22, they can be "kiss-cut" or partially scored to permit removal of only a portion of the entire label. For example, the area of the labels containing the bar code indicia 16 and 32 may be removable separate from the entire label.

It will be appreciated by persons skilled in the art that all manner of imprinting the shipping information and packing list information on shipping label 14 and packing list label 22, respectively, are contemplated. While the particular manner of printing on the labels of the present invention is not critical, any suitable label printing method known in the art is acceptable. Such printing techniques include direct thermal, thermal transfer, ink jet, dot matrix, laser, and various impact-type printing. It will be further appreciated that the materials for shipping label 14, clear film 20, packing list 22 and base ply 26 are of any suitable type known in the art for labels. These include plastic and paper-based materials. It will further be contemplated that while there has been described a combination of a shipping label with a single packing list label, the invention encompasses more than two composite labels. For example, if the packing list requires two sheets to list the package contents, the base ply layer 26 could be a clear film such as layer 20 and beneath the primary adhesive layer 30 could be positioned a second packing list label comprising a second packing list layer having the additional packing information printed thereon. In this example, another fugitive adhesive layer is required and a base ply is affixed to the package by a primary adhesive. In this example, two print and apply stations for the packing label would likely be required, with the first station applying one of the packing list labels and the second station applying the other packing list label. Thereafter a third print and apply station would be required for application of the shipping label.

In another contemplated variation, the present invention comprises only two label layers with an intermediate adhesive or other bonding mechanism. More particularly, in certain situations, for example, high-volume shipping to the same recipient of a standing order of goods, it may be desirable for the label manufacturer to simply pre-print the packing list information on the base ply of a coupon-type label. The shipping information could likewise be pre-printed by the label manufacturer on the top ply of the coupon-type label. Thus in this version, the label comprises a top layer bearing the shipping information, and a base layer bearing the packing list information. The top layer is removably affixed to the base ply by means of a fugitive adhesive, thermal lamination or bonding, or any other suitable technique. The overall label of this embodiment is affixed to the package using a primary adhesive, or a removable-type adhesive, where appropriate.

In yet another contemplated variation, the present invention may comprise a top shipping label ply (whether or not pre-printed by the label manufacturer) affixed to a packing list ply (whether or not pre-printed by the label manufacturer) by a removable-type adhesive. Removable-type adhesives are well known and generally permit peeling one layer from another, affixing it with the removable-type adhesive to another surface, and again removing the layer and affixing to yet another surface.

While the invention has been described with respect to several preferred embodiments and examples, the invention is not intended to be limited to the particular details and configurations described and shown herein. Furthermore, the invention is not intended to be limited solely to packing list and shipping labels. The invention will be construed and understood by persons skilled in the art to encompass the various features and advantages described herein as well as modifications and variations thereof. The scope of the present invention is defined by the appended claims.

What is claimed is:

1. A method of labeling packages, comprising:

applying a base ply to an outer surface of a package by means of a primary adhesive;

applying an indicia-bearing label sheet to said base ply by means of a fugitive adhesive; and applying a composite of (i) another indicia-bearing label sheet and (ii) an intermediate ply to which said another indicia-bearing label sheet is removably affixed by means of a fugitive adhesive, to the package such that at least part of said intermediate ply resides between said indicia-bearing label sheet and said another indicia-bearing label sheet.

2. A method according to claim 1 further comprising printing said indicia on said indicia-bearing label sheet prior to applying it to said base ply.

3. A method according to claim 2 wherein said printed indicia on said indicia-bearing label sheet includes packing list information.

4. A method according to claim 3 wherein said printed indicia further includes machine readable verification data.

5. A method according to claim 4 further comprising reading said machine readable verification data on said indicia-bearing label sheet.

6. A method according to claim 1 further comprising printing said indicia on said another indicia-bearing label sheet prior to applying it to the package.

7. A method according to claim 6 wherein said printed indicia on said another indicia-bearing label sheet includes shipping information.

8. A method according to claim 7 wherein said printed indicia further includes machine readable verification data.

9. A method according to claim 8 further comprising reading said machine readable verification data on said another indicia-bearing label sheet.

10. A method according to claim 1 wherein said indicia-bearing label sheet and said another indicia-bearing label sheet are applied to the package in registration with one another such that at least a portion of said indicia on said indicia-bearing label sheet is concealed by said composite of (i) another indicia-bearing label sheet and (ii) an intermediate ply.

11. A method according to claim 1 wherein said applying steps are performed automatically with label-applying equipment.

12. A method according to claim 1 wherein said applying steps are performed manually.

13. A composite label, comprising:

a first indicia-bearing label sheet;

an intermediate ply to which said first sheet is removably affixed by means of a fugitive adhesive;

an adhesive layer on a side of said intermediate ply opposite said first sheet;

a second indicia-bearing label sheet to which said intermediate ply is adhered by means of said adhesive; and a base ply to which said second sheet is removably affixed by means of a fugitive adhesive.

14. A composite label of claim 13 wherein said intermediate ply is a substantially transparent film.

15. A composite label of claim 13 wherein said adhesive layer on said intermediate ply is not a fugitive adhesive.

16. A composite label of claim 15 wherein said adhesive is a pressure-sensitive type adhesive.

17. A composite label, comprising:

a first indicia-bearing label sheet;

a fugitive adhesive layer on said first sheet;

a substantially transparent film layer to which said first sheet is removably affixed by means of said fugitive adhesive;

a primary adhesive layer on a side of said transparent film opposite said first sheet;

a second indicia-bearing label sheet to which said transparent film is adhered by means of said primary adhesive;

a second fugitive adhesive layer on said second sheet;

a base ply to which said second sheet is attached by means of said second fugitive adhesive; and a primary adhesive on said base ply for adhering said composite label to a package surface.

18. A composite label of claim 17 wherein said indicia on said first indicia-bearing label sheet includes shipping information.

19. A composite label of claim 17 wherein said indicia on said second indicia-bearing label sheet includes packing list information.

20. A composite label of claim 17 wherein said primary adhesive layers comprise pressure-sensitive type adhesives.

21. A composite label of claim 17 wherein said indicia on said first indicia-bearing label sheet includes machine readable verification data.

22. A composite label of claim 21 wherein said machine readable indicia is a bar code.

23. A composite label of claim 17 wherein said indicia on said second indicia-bearing label sheet includes machine readable verification data.

24. A composite label of claim 23 wherein said machine readable indicia is a bar code.

* * * * *